(12) United States Patent
Coomans et al.

(10) Patent No.: US 10,917,224 B2
(45) Date of Patent: Feb. 9, 2021

(54) FULL DUPLEX CABLE COMMUNICATION (71) Applicant: VECIMA NETWORKS INC., Victoria (CA)

(72) Inventors: Werner Coomans, Antwerp (BE); Rex Coldren, Phoenix, AZ (US)

(73) Assignee: VECIMA NETWORKS INC., Victoria (CA)

(*) Notice: Subject to any disclaimer, the term of this patent is extended or adjusted under 35 U.S.C. 154(b) by 0 days.

(21) Appl. No.: 16/369,407

(22) Filed: Mar. 29, 2019

(65) Prior Publication Data
US 2019/0305920 A1 Oct. 3, 2019

(30) Foreign Application Priority Data
Mar. 29, 2018 (EP) ..................... 18164936

(51) Int. Cl.
*H04L 5/14* (2006.01)
*H04J 3/00* (2006.01)
*H04B 3/20* (2006.01)
*H04B 1/38* (2015.01)
*H04B 3/52* (2006.01)
*H04B 3/487* (2015.01)
*H04L 5/00* (2006.01)

(52) U.S. Cl.
CPC ................. *H04L 5/14* (2013.01); *H04B 3/20* (2013.01); *H04J 3/00* (2013.01); *H04L 5/1461* (2013.01); *H04B 1/38* (2013.01); *H04B 3/487* (2015.01); *H04B 3/52* (2013.01); *H04L 5/0007* (2013.01)

(58) Field of Classification Search
CPC ....... H04L 5/14; H04L 5/1461; H04L 5/0007; H04J 3/00; H04B 3/20; H04B 3/487; H04B 1/38; H04B 3/52

USPC ......................................................... 370/295
See application file for complete search history.

(56) References Cited

U.S. PATENT DOCUMENTS

| 2018/0287770 | A1* | 10/2018 | Barr ......................... H04B 3/32 |
| 2018/0294837 | A1* | 10/2018 | Chapman ............ H04L 12/2801 |
| 2019/0044555 | A1* | 2/2019 | Hewavithana ............ H04L 5/14 |
| 2019/0190684 | A1* | 6/2019 | Bowler ............... H04L 12/2801 |

FOREIGN PATENT DOCUMENTS

| GB | 2553183 A | 2/2018 |
| WO | WO2018050064 A1 | 3/2018 |

OTHER PUBLICATIONS

Extended Search Report; dated Jul. 12, 2018 for EP Application No. 18164936.9.

* cited by examiner

*Primary Examiner* — Mang Hang Yeung
(74) *Attorney, Agent, or Firm* — Mendelsohn Dunleavy, P.C.; Steve Mendelsohn (57) ABSTRACT

Example embodiments describe a controller comprising means for performing i) discovering a mapping between receive analogue to digital converters, RxADCs, of a full duplex node (100) and cable modems (111-113, 121-123, 131-133, 141-143) connected to the full duplex node; and wherein the cable modems share a common communication bandwidth; and ii) determining, based on the mapping, sounding groups (152, 162) by grouping cable modems (111-131, 121-123) mapped to a same RxADC (151) into a respective sounding group (152); and wherein a sounding group is indicative for an upper bound of possible interfering cable modems.

18 Claims, 5 Drawing Sheets

FULL DUPLEX CABLE COMMUNICATION

TECHNICAL FIELD

Various example embodiments relate to the determination of transmission groups for full duplex communication between a full duplex node and cable modems.

BACKGROUND

A full duplex cable modem termination system, CMTS, typically comprises a full duplex node with a plurality of output ports. An output port can be connected to a separate cable plant section which connects to a plurality of cable modems. The CMTS further connects to an aggregation network thereby providing downstream and upstream network access to the cable modems and, hence, end users.

Although connected to different output ports, cable modems on different cable plant sections may still share the same communication bandwidth on the cable medium by combining different output ports to a single downstream or upstream processing chain within the full duplex node. All cable modems that share the same communication bandwidth are typically referred to as a service group.

Full duplex communication allows simultaneous upstream and downstream communication within the same frequency sub-bands of the communication bandwidth. To avoid interference between upstream traffic from one cable modem and downstream traffic for another cable modem, interfering cable modems within a service group may further be assigned to the same transmission group. Cable modems within a transmission group are then not allowed to perform simultaneous upstream and downstream communication within a respective sub-band during any allocated time-slot.

To determine the transmission groups, interference sounding is performed between the cable modems, i.e., every modem on its turn generates an upstream sounding signal while the other modems measure the impact on the corresponding frequencies. From these sounding measurements, the interfering cable modems are identified and grouped together in interference groups. The interference groups on their turn are then assigned to a transmission group. A transmission group may further comprise more than one interference group of cable modems.

SUMMARY

In order to determine the transmission groups, interfering cable modems must be identified. Therefore, sounding is performed for each cable modem within a service group and is typically done sequentially. This results in a long process during which the cable network experiences reduced operability.

Amongst others, it is an object to provide a solution that overcomes the above shortcoming and to make the determination of the transmission groups more efficient.

This object is achieved, according to a first example aspect of the present disclosure, by a controller comprising means for performing i) discovering a mapping between receive analogue to digital converters, RxADCs, of a full duplex node and cable modems connected to the full duplex node; and wherein the cable modems share a common communication bandwidth; and ii) determining, based on the mapping, sounding groups by grouping cable modems mapped to a same RxADC into a respective sounding group; and wherein a sounding group is indicative for an upper bound of possible interfering cable modems.

In other words, the full duplex node comprises multiple receive analogue to digital converters or, shortly, RxADCs, which connect to different subsets of the cable modems. For example, cable modems mapped to a respective RxADC may be connected to a single radio frequency, RF, output port or to a plurality of such radio frequency, RF, output ports. The cable modems that are operating on the same communication bandwidth are thus subdivided into sounding groups according to the RxADC they are connected to. By the fact that the different cable modems are connected to a different RxADC, cable modems connected to different RxADCs will not interfere with each other because they are guaranteed to be connected to different RF output ports. Therefore, the sounding groups define a coarse grouping of cable modems into groups that do not interfere with each other. The sounding groups are thus indicative for an implicit assumption that cable modems from different sounding groups are allowed to perform simultaneous upstream and downstream communication within the same frequency sub-band and within the same time slot because they will not interfere with each other.

It is an advantage that no interference measurements need to be performed between modems in different sounding groups, which already provide a first subdivision of the cable modem into non-interfering groups. These groupings may then for example be used to derive the further transmission groups. It is therefore a further advantage that the sounding or any other type of interference measurement may be performed in parallel for the different sounding groups thereby reducing the time needed for sounding measurements by at least a factor of two.

According to an example embodiment, the controller further comprises means for performing iii) grouping, based on the sounding groups, the cable modems into transmission groups; and wherein the common communication bandwidth is configurable into a plurality of non-overlapping full duplex sub-bands; and wherein all cable modems within a transmission group are configured to perform all together either upstream or downstream communication within a respective sub-band during any allocated time-slot.

According to a further example embodiment, the controller further comprises means for performing i) obtaining interference measurements between cable modems of a respective sounding group; and wherein grouping the cable modems into transmission groups is further based on the interference measurements.

For example, this may be achieved by grouping interfering cable modems within a respective sounding group into respective interference groups based on the sounding measurements; and grouping one or more of the interference groups into a respective transmission group.

It is thus an advantage that transmissions groups can be defined with a finer granularity while avoiding the need for performing interference measurements between all the cable modems.

Alternatively, the transmission groups may also be obtained directly from the sounding groups, e.g., by assigning one or more sounding groups directly to a transmission group. This even avoids the need for interference measurements all together. Furthermore, this reduces the initialization time of the cable network. Moreover, further sounding measurements may then be performed at a later stage within the sounding groups, but with less impact on the network.

According to an example embodiment, the controller further comprises means for performing:

detecting a joining cable modem connecting to the full duplex node and thereby joining the cable modems; and discovering a mapping between one of RxADCs, and the joining cable modem; and adding, based on the mapping, the joining cable modems to a selected sounding group of the sounding groups.

In other words, during operation, cable modems may be removed or added to the cable network. A joining cable modem will also interfere with the existing cable modems and additional sounding measurement may be required. By first adding the joining cable modem to one of the sounding groups, the amount of further sounding measurements are again reduced.

Additionally, the controller may then further comprise means for performing:

obtaining additional sounding measurements between the joining cable modem and the other cable modems of the selected sounding group.

The interference measurements may further be performed by sequential sounding between cable modems of the respective sounding group.

Advantageously, the interference measurements are performed in parallel for the different sounding groups. This has the further advantage that the time needed for performing the measurements and the related overhead will be reduced.

According to an example embodiment, the discovering the mapping is based on topology information.

Topology information comprises information on the topology of the cable network, i.e., which cable modem is connected to what output port of the full duplex node. Topology information may be available locally in the full duplex node, may be retrieved from an upstream node or obtained by interaction with the cable modems themselves. By using topology information, the mapping may be done during normal operation of the cable network.

According to an example embodiment the means of the controller comprise at least one processor and at least one memory including computer program code, the at least one memory and computer program code configured to, with the at least one processor, cause the performance of the controller.

According to an example embodiment, a full duplex node comprising the controller according to any one of the example embodiments is disclosed.

According to an example embodiment, a full duplex node comprising means for interoperating remotely with the controller according to any one of the example embodiments is disclosed.

According to a second example aspect a method is disclosed comprising i) discovering a mapping between receive analogue to digital converters, RxADCs, of a full duplex node and cable modems connected to the full duplex node; and wherein the cable modems and full duplex node share communication bandwidth; and ii) determining, based on the mapping, sounding groups by grouping cable modems mapped to a same RxADC into a respective sounding group; and wherein a sounding group is indicative for an upper bound of possible interfering cable modems.

BRIEF DESCRIPTION OF THE DRAWINGS

Some example embodiments will now be described with reference to the accompanying drawings.

DETAILED DESCRIPTION OF EMBODIMENT(S)

Figure 1:
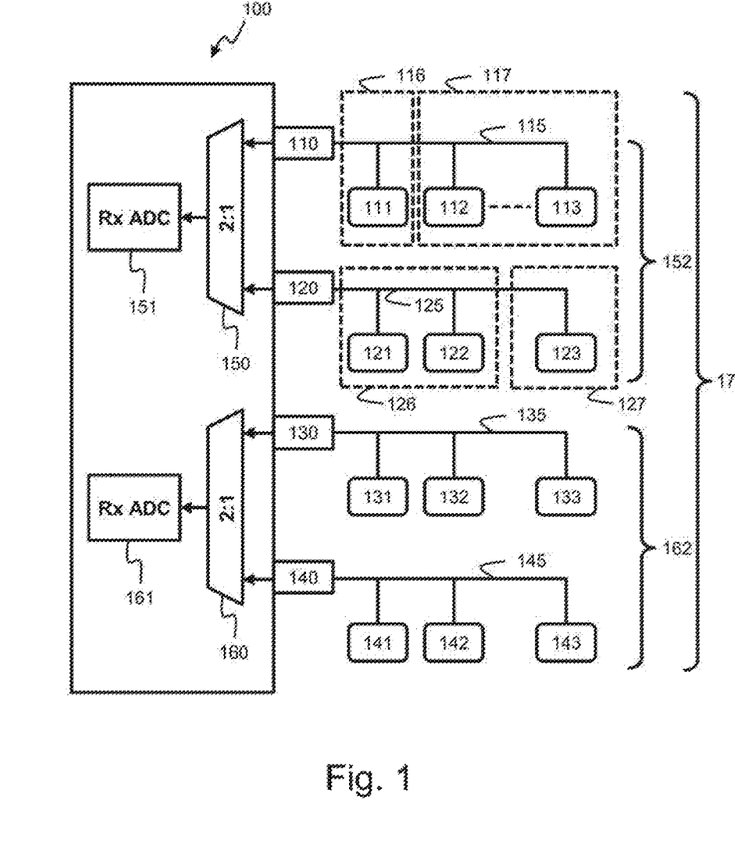
FIG. 1 illustrates an example embodiment of a full duplex node connected to a plurality of cable modems.

FIG. 1 illustrates an example embodiment of a full duplex node 100 or, shortly, FDX node 100. FDX node 100 comprises a plurality of radio frequency, RF, output ports 110, 120, 130, 140. Each output port may be connected to a cable plant section 115, 125, 135, 145. A respective cable plant section is then further connectable to a plurality of cable modems 111-113, 121-123, 131-133, 141-143. Cable modems on a same cable plant section share the cable medium as they are connectable to the same output port. Cable modems on a same cable plant section therefore also share the communication bandwidth available on the cable medium. Analogue communication signals from different output ports, e.g. output ports 110, 120 or 130, 140 may then be combined together by a multiplexer 150, 160 into a single analogue communication signal. FDX node 100 further comprises a plurality of receive analogue to digital converters 151, 161 or, shortly, RxADCs. An RxADC converts a multiplexed analogue communication signal from a respective multiplexer into a digital communication signal which may then be further processed by a baseband processing chain in the FDX node 100 or further upstream in an aggregation network. FIG. 1 only illustrates some of the upstream processing means but may also comprise further downstream processing means for providing downstream communication to the connected cable modems. FDX node 100 is further configured such that cable modems connected to ports 110, 120, 130, 140 share the same communication bandwidth, i.e., the cable modems are not allowed to transmit within the same frequency band at the same time and, the other way around, downstream signals transmitted by the FDX node are received at all cable modems.

Figure 2:
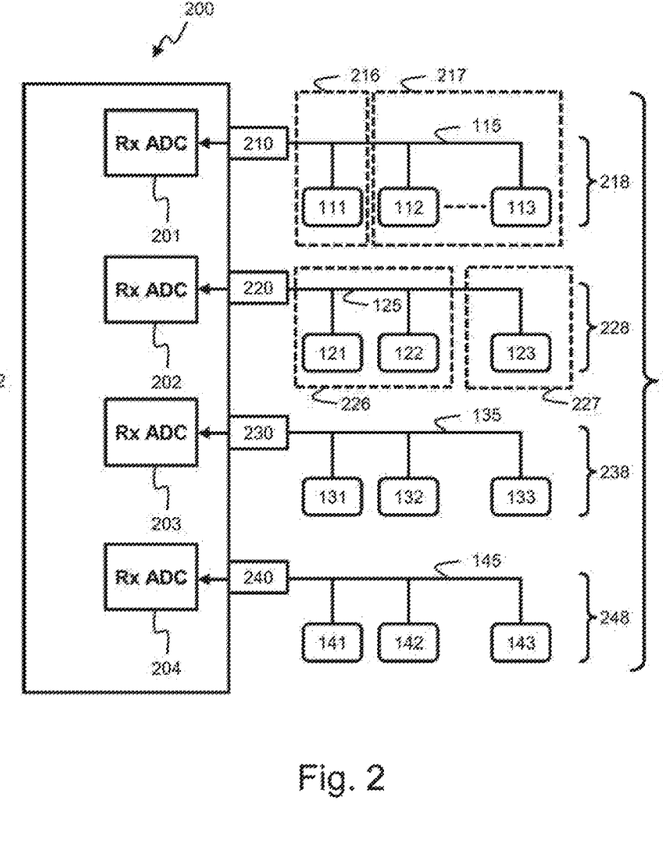
FIG. 2 illustrates another example embodiment of a full duplex node connected to a plurality of cable modems.

FIG. 2 illustrates another example embodiment of an FDX node 200. FDX node 200 comprises a plurality of radio frequency, RF, output ports 210, 220, 230, 240. Each output port may be connected to a cable plant section 115, 125, 135, 145. A respective cable plant section is then further connectable to a plurality of cable modems 111-113, 121-123, 131-133, 141-143. Cable modems on a same cable plant section share the cable medium as they are connectable to the same output port. Cable modems on a same cable plant section therefore also share the communication bandwidth available on the cable medium. FDX node 200 further comprises a plurality of RxADCs 201, 202, 203, 204. An RxADC converts an analogue communication signal received on a respective output port into a digital communication signal which may then be further processed by a baseband processing chain in the FDX node 200 or further upstream in an aggregation network. FIG. 2 only illustrates some of the upstream processing means but may also comprise further downstream processing means for providing downstream communication to the connected cable modems. FDX node 200 is further configured such that cable modems connected to ports 210, 220, 230, 240 share the same communication bandwidth, i.e., the cable modems are not allowed to transmit within the same frequency band at the same time and, the other way around, downstream signals transmitted by the FDX node are received at all cable modems.

FDX nodes 100 and 200 are configured to perform full duplex communication with connected cable modems over the shared communication bandwidth. Full duplex communication is to be understood as the possibility for simultaneous upstream and downstream communication between cable modems and the FDX node within the same frequency bands of the communication bandwidth and within the same time slot. Full duplex communication is not the same as emulated full-duplex communication such as frequency division duplexing, FDD, or time division duplexing, TDD.

Figure 3:
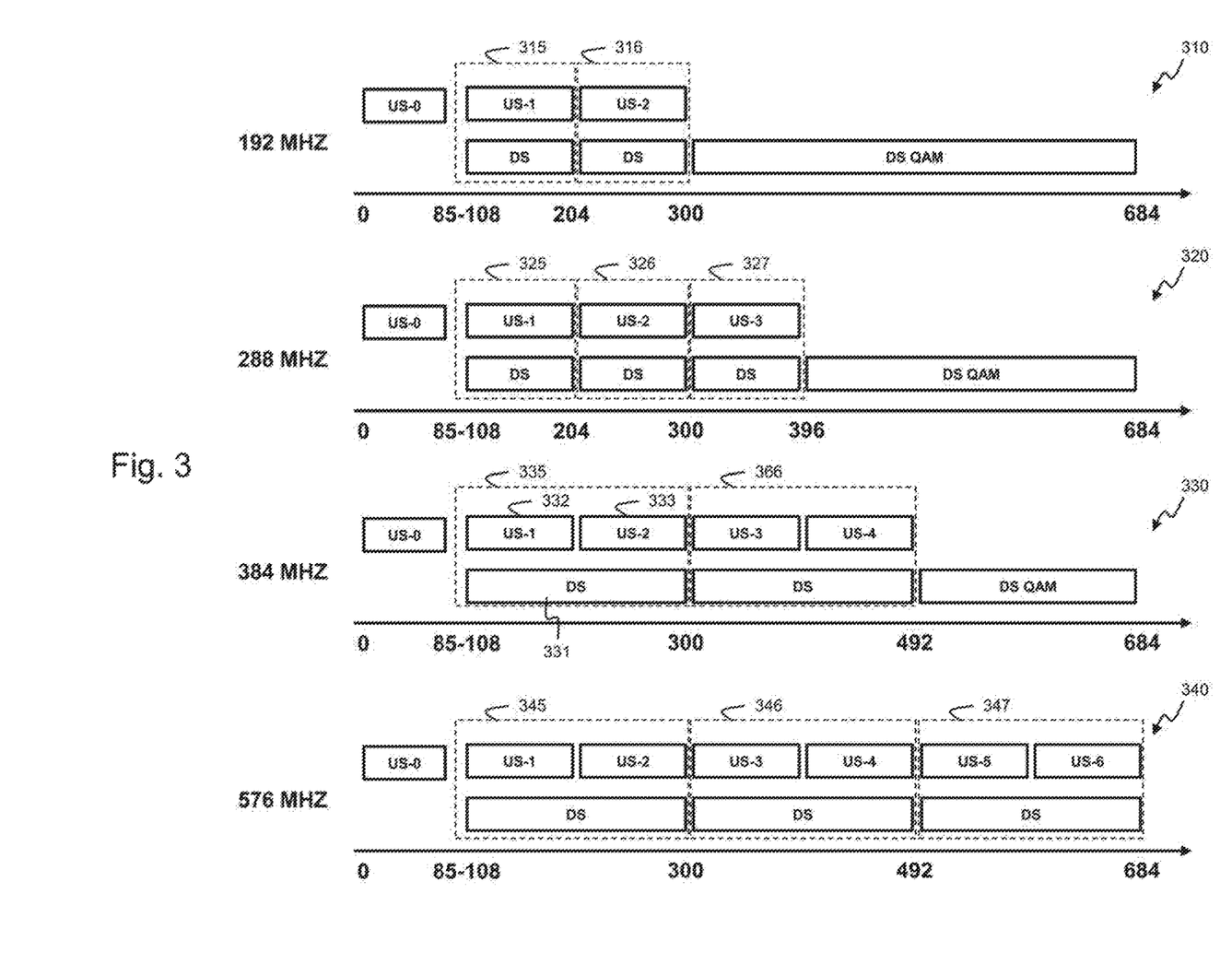
FIG. 3 illustrates different bandwidth configurations comprising a plurality of sub-bands for full duplex communication.

To provide full duplex communication, FDX nodes 100, 200 and the connected cable modems may operate according to the extension for full duplex communication of the international telecommunications standard Data Over Cable Service Interface Specification, DOCSIS, permitting the addition of high-bandwidth data transfer over an existing hybrid fibre-coaxial (HFC) infrastructure, e.g., according to the DOCSIS 3.1 Full Duplex specification. FIG. 3 illustrates different full duplex bandwidth configurations for the DOCSIS 3.1 specifications. The plot 310 illustrates a first configuration where 192 MHz of the communication bandwidth is reserved for two full-duplex sub-bands 315 and 316 each comprising one upstream OFDMA channel and one downstream OFDM channel. The plot 320 illustrates a second configuration where 288 MHz of the communication bandwidth is reserved for three full-duplex sub-bands 325, 326 and 327 each comprising one upstream OFDMA channel and one downstream OFDM channel. The plot 330 illustrates a third configuration where 384 MHz of the communication bandwidth is reserved for two full-duplex sub-bands 335 and 336 each comprising two upstream OFDMA channels 332, 333 and one downstream OFDM channel. The plot 340 illustrates a fourth configuration where 576 MHz of the communication bandwidth is reserved for three full-duplex sub-bands 345, 346 and 347 each comprising two upstream OFDMA channels and one downstream OFDM channel. Within the DOCSIS specification, cable modems that share the communication bandwidth are referred to as a Service Group (SG). In both examples of FIG. 1 and FIG. 2, all cable modems 111-113, 121-123, 131-133, 141-143 belong to the same Service Group.

Figure 4:
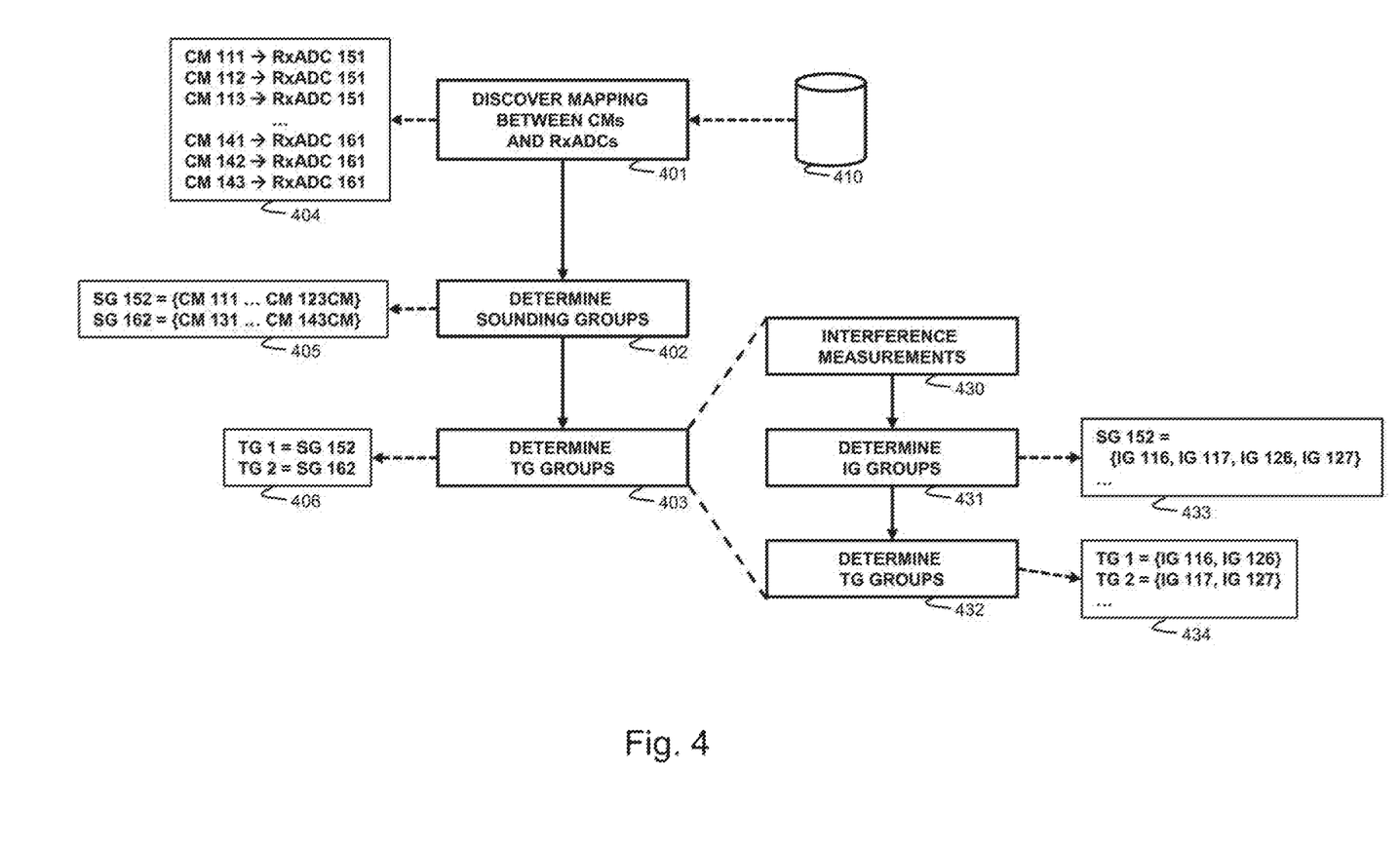
FIG. 4 illustrates an example embodiment of steps performed by a controller for determining transmission groups in a cable network.

Because of the full duplex operation, one cable modem's upstream communication signals may interfere with downstream communication signals from the FDX node 100, 200. FIG. 4 illustrates steps performed according to an example embodiment to determine groups of possibly interfering cable modems, referred to as sounding groups, and, subsequently, to assign cable modems to transmission groups based on these sounding groups. The steps are further illustrated by an example case applied to the FDX node 100 by showing different groups 404, 405, 406, 433, 434 resulting from different grouping operations. The reference numbers within these groups refer to the reference numbers of FIG. 1.

In a first discovering step 401, a mapping 404 is determined between the RxADCs of the FDX node and the connected cable modems. For example, for FDX node 100, cable modems 111-113 and 121-123 are mapped to RxADC 151 and cable modems 131-133 and 141-143 are mapped to RxADC 161. Similarly, for FDX node 200, cable modems 111-113 may be mapped to RxADC 201, cable modems 121-123 mapped to RxADC 202, cable modems 131-133 mapped to RxADC 203 and cable modems 141-143 mapped to RxADC 204. The mapping may be done based on topology information 410 outlining the architecture of the cable network, i.e., how each cable modem is connected to the FDX node. Topology information may be obtainable from the aggregation network upstream of the FDX node, e.g. from a network management apparatus. Topology information may also be derivable from within the FDX node itself, e.g. by inspection of data retrieved from the different RxADCs or by control messages exchanged between the FDX node and the connected cable modems.

In a subsequent grouping step 402, the identified and mapped cable modems are grouped into sounding groups 405. The grouping is performed by grouping the cable modems that are mapped to the same RxADC into a single sounding group. For FDX node 100 for example, cable modems 111-113 and 121-123 are grouped into a first sounding group 152 and cable modems 131-133 and 141-143 are grouped into a second sounding group 162. Similarly, for FDX node 200, cable modems 111-113 may be grouped into a first sounding group 218, cable modems 121-123 grouped into a second sounding group 228, cable modems 131-133 grouped into a third sounding group 238 and cable modems 141-143 grouped into a fourth sounding group 248. A sounding group is further indicative for an upper bound of a set of the cable modems that will interfere with each other. In other words, a sounding group is defined as a group of cable modems that will not suffer from interference from cable modems from another sounding group. The above may further be assured by providing a sufficient isolation between cable modems that are connected to different RxADCs or between cable modems that are connected to different output ports. State of the art cable output ports already offer an isolation of more than 25 dB which is more than sufficient to achieve an interference level at the cable modem of less than 63 dB with respect to the received downstream signal.

In a next step 403, the cable modems are grouped into transmission groups 406, 434 based on the sounding groups. Cable modems within such a transmission group are then only allowed to either transmit or receive data on any full-duplex sub-band and allocated time-slot of the communication bandwidth. For example, referring to the bandwidth configuration 330, cable modems within a same transmission group would not be allowed to simultaneously, i.e. at the same time, receive data from OFDM channel 331 and to transmit data on any one of OFDMA channel 332 and 333. In other words, cable modems from different transmission groups are allowed to simultaneously transmit and receive on a full-duplex sub-band, i.e. to perform upstream communication on an upstream OFMDA channel of the full-duplex sub-band and to perform downstream communication on a downstream OFDM channel of the same full-duplex sub-band. Therefore, cable modems from different transmission groups may not interfere with each other because otherwise a transmitting modem from one transmission group could possibly interfere with a receiving cable modem of another transmission group. As the sounding groups already define an upper bound for interfering cable modems, the grouping of cable modems into transmission groups may be based on the sounding groups.

For example, the transmission groups may be selected identical to the sounding groups as shown in the grouping 406. Alternatively, a transmission group may be selected as a combination of different sounding groups. Referring to FDX node 200, a first transmission group may be selected as comprising all the cable modems of sounding groups 218 and 228 and a second transmission group may be selected as comprising all the cable modems of sounding groups 238 and 248.

According to a further example embodiment, the transmission groups may be determined by performing further interference measurements. This is illustrated by sub-steps 430, 431 and 432. In step 430, interference measurements between cable modems of each sounding group are obtained. Based on these interference measurements, in step 431, each sounding group is further subdivided into groups 433 of interfering cable modems, also referred to as interference groups (IGs). Referring to FDX node 100, the interference groups 116, 117, 126 and 127 of interfering cable modems may be obtained within the sounding group 152. Referring to FDX node 200, the interference groups 216, 217 may be obtained for the sounding group 218 and the interference groups 226 and 227 may be obtained for the sounding group 228. Then, in the next step 432, the grouping of the cable modems in transmission groups 434 is based on the obtained interference groups, i.e. interference groups are combined into the transmissions groups. For this, interference groups from different sounding groups may be combined. Advantageously, the transmission groups are composed such that each group accounts for equal amount of upstream and downstream traffic, thereby achieving an optimal use of the communication bandwidth.

Interference measurements for the different sounding groups may further be performed in parallel because, by design, interference measurements within one sounding group will not interfere with interference measurements in another sounding group.

Interference measurements between cable modems of a sounding group may be performed by sounding. One cable modem then transmits a predefined test or sounding signal onto the cable medium and the other cable modems listen for the signal from which the interference from the transmitting modem to the receiving modems is determined. This process is then repeated for each cable modem within the sounding group. The sounding process may be done sequentially, i.e. the cable modems transmit the test signal one after the other. The sounding process may also be performed in parallel, i.e. multiple modems transmit sounding signals at different frequencies, at the cost of a reduced resolution of the measurement.

Figure 5:
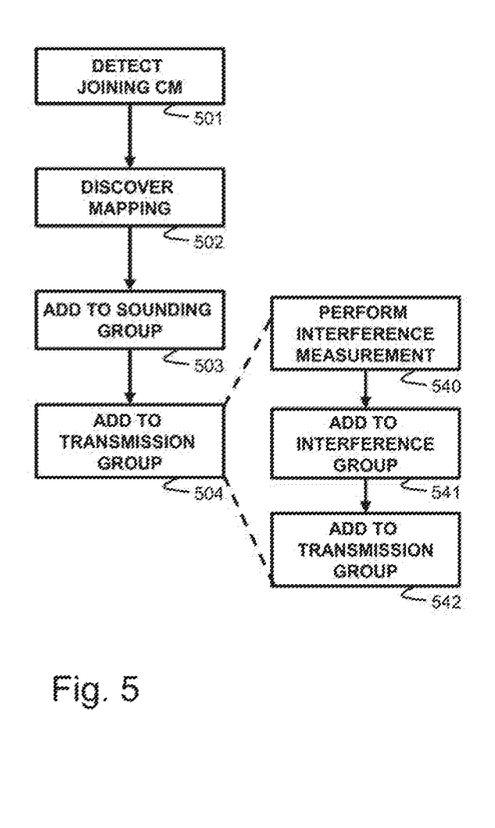
FIG. 5 illustrates an example embodiment of steps performed by a controller for adding a joining cable modem to existing transmission groups in a cable network.

FIG. 5 illustrates steps performed according to an example embodiment when a cable modem joins a cable modem network, for example, when one of cable modem initiates communication with FDX node 100 or 200. In a first step 501, a joining cable modem connecting to the FDX node 100 or 200 is detected. Then, in step 502, the mapping between the joining cable modem and the RxADCs of the FDX node is performed. This may be done in a similar fashion as in step 401 above. Thereupon, in step 503, the joining cable modem is added to one of the sounding groups based on the mapping, i.e., the joining cable modem is added to the sounding group which groups the cable modems that are connected to the same RxADC as the joining cable modem. The method then proceeds to the next step 504 and adds the joining cable modem to one of the transmission groups based on the sounding group it belongs to.

Similar to step 403, step 504 may be performed by executing a first sub-step 540 in which interference measurements are performed between the joining cable modems and the other cable modems in the sounding group. These interference measurements may again be performed by sounding. Based on the additional interference measurements, in sub-step 541, the joining cable modem is then added to one of the interference groups within the respective sounding group, similar to step 431. Lastly, in step 542, the joining cable modem is then added to the transmission group to which the interference group was assigned, similar to step 432.

Figure 6:
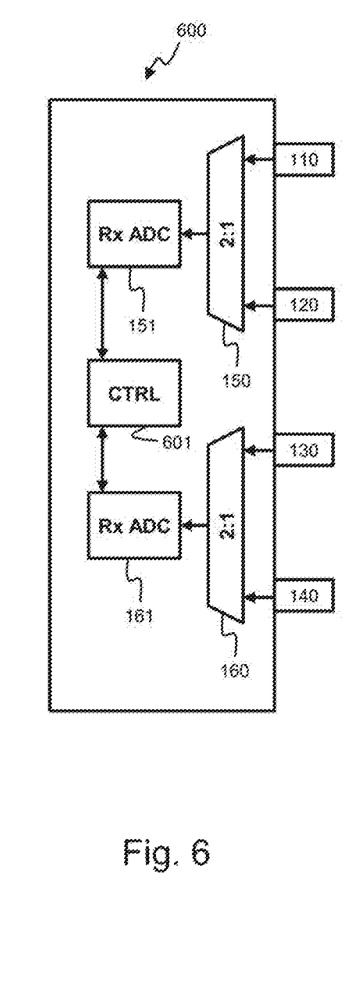
FIG. 6 illustrates an example embodiment of a full duplex node comprising a controller for performing the steps as illustrated in FIGS. 4 and 5.

FIG. 6 illustrates an FDX node 600 according to an example embodiment. FDX 600 illustrates a further detail of FDX node 100. FDX node 600 further comprises a controller 601. Controller 601 may be configured to perform any of the steps according to the above example embodiments and may be configured to interact with the other components of FDX node 600 for performing these steps.

Figure 7:
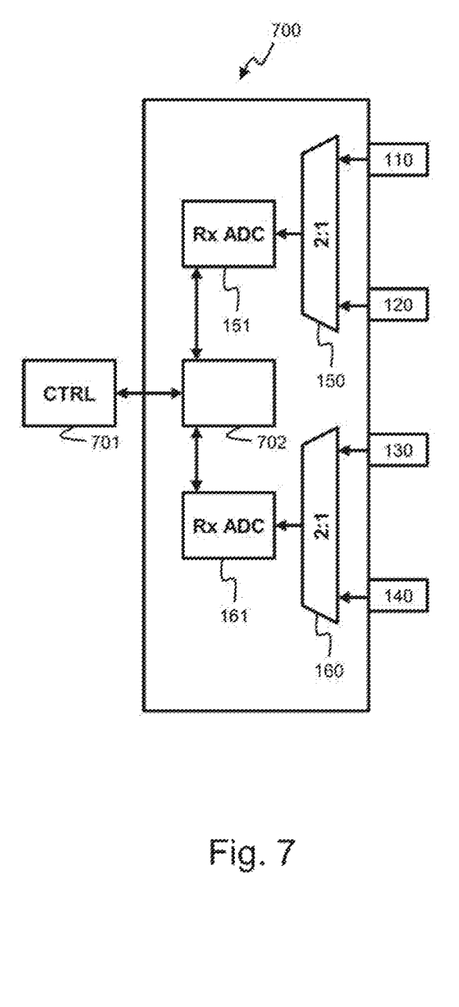
FIG. 7 illustrates another example embodiment of a full duplex node and a remote controller for performing the steps as illustrated in FIGS. 4 and 5.

FIG. 7 illustrates an FDX node 700 according to an example embodiment. FDX 700 illustrates a further detail of FDX node 100. FDX node 700 further comprises a controller 702. Controller 702 may be configured to interact with a remote controller 701 wherein the remote controller 701 is further configured to perform any of the steps according to the above example embodiments. Controller 702 may then be configured to interact with the other components of FDX node 700 and to exchange information and instructions with controller 701 to perform the step according to the above example embodiments. The controllers 601, 701 and 702 may also be arranged into FDX node 200 in an equivalent way.

Figure 8:
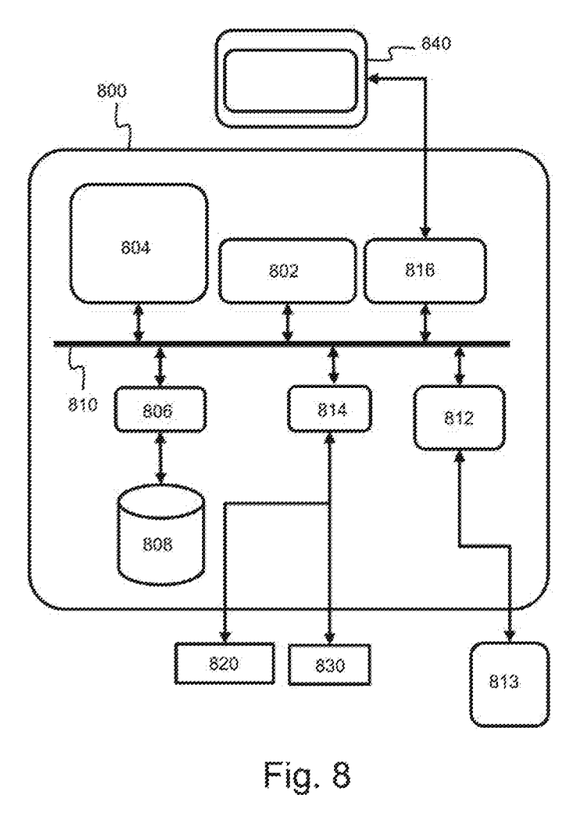
FIG. 8 illustrates an example embodiment of a computing system for performing the steps as illustrated in FIGS. 4 and 5.

FIG. 8 shows a suitable computing system 800 according to an example embodiment. Computing system 800 comprises means for performing the steps according to the above example embodiments. Computing system 800 may therefore be used as suitable implementation of controller 601, 701 or 702. Computing system 800 may in general be formed as a suitable general-purpose computer and comprise a bus 810, a processor 802, a local memory 804, one or more optional input interfaces 814, one or more optional output interfaces 816, a communication interface 812, storage element interface 806 and one or more storage elements 808. Bus 810 may comprise one or more conductors that permit communication among the components of the computing system 800. Processor 802 may include any type of conventional processor or microprocessor that interprets and executes programming instructions. Local memory 804 may include a random-access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator to input information to the computing device 800, such as a keyboard 820, a mouse 830, a pen, voice recognition and/or biometric mechanisms, etc. Output interface 816 may comprise one or more conventional mechanisms that output information to the operator, such as a display 840, etc. Communication interface 812 may comprise any transceiver-like mechanism such as for example one or more Ethernet interfaces that enables computing system 800 to communicate with other devices and/or systems. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage elements 808 above is described as a local disk, in general any other suitable computer-readable media such as a removable magnetic disk, optical storage media such as a CD or DVD, -ROM disk, solid state drives, flash memory cards, . . . may be used.

Although the present invention has been illustrated by reference to specific embodiments, it will be apparent to those skilled in the art that the invention is not limited to the details of the foregoing example embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A controller comprising:
at least one processor; and
at least one memory configured to store information for the at least one processor, wherein the at least one processor is configured to:
discover a mapping between receive analogue to digital converters (RxADCs) of a full duplex node and cable modems connected to the full duplex node, wherein the cable modems share a common communication bandwidth;
determine, based on the mapping, sounding groups by grouping cable modems mapped to a same RxADC into a respective sounding group, wherein a sounding group is indicative of an upper bound of possible interfering cable modems;
group, based on the sounding groups, the cable modems into transmission groups, wherein the common communication bandwidth is configurable into a plurality of non-overlapping full duplex sub-bands; and
control cable modems within a transmission group to perform either only upstream communication or only downstream communication within a respective sub-band during any allocated time-slot, thereby limiting interference.

2. The controller according to claim 1, wherein the at least one processor is further configured to obtain interference measurements between cable modems of a respective sounding group, wherein the grouping of the cable modems into transmission groups by the at least one processor is further based on the interference measurements.

3. The controller according to claim 2 wherein the grouping of the cable modems into transmission groups further comprises:
the at least one processor grouping interfering cable modems within a respective sounding group into respective interference groups based on the interference measurements; and
the at least one processor grouping one or more of the interference groups into a respective transmission group.

4. The controller according to claim 2, wherein the interference measurements are performed by the at least one processor sequentially sounding between cable modems of the respective sounding group.

5. The controller according to claim 2, wherein the interference measurements are performed by the at least one processor in parallel for the different sounding groups.

6. The controller according to claim 1, wherein the at least one processor is further configured to:
detect a joining cable modem connecting to the full duplex node and thereby joining the cable modems;
discover a mapping between one of the RxADCs and the joining cable modem; and
add, based on the mapping, the joining cable modems to a selected sounding group of the sounding groups.

7. The controller according to claim 6, wherein the at least one processor is further configured to obtain additional sounding measurements between the joining cable modem and the other cable modems of the selected sounding group.

8. The controller according to claim 1, wherein cable modems mapped to a respective RxADC are connected to a single radio frequency (RF) port.

9. The controller according to claim 1, wherein cable modems mapped to a respective RxADC are connected to a plurality of RF ports.

10. The controller according to claim 1, wherein the at least one processor is configured to discover the mapping is based on topology information.

11. The controller according to claim 1, wherein the at least one memory is configured to store computer program code configured to, with the at least one processor, cause the controller to discover the mapping and determine the sounding groups.

12. The controller of claim 1, wherein the controller controls (i) a first cable modem within a first transmission group to perform upstream communication and (ii) a different cable modem within a different transmission group to perform downstream communication within a respective sub-band during any allocated time-slot.

13. A full duplex node comprising a controller comprising:
at least one processor; and
at least one memory configured to store information for the at least one processor, wherein the at least one processor is configured to:

discover a mapping between receive analogue to digital converters (RxADCs) of the full duplex node and cable modems connected to the full duplex node, wherein the cable modems share a common communication bandwidth;

determine, based on the mapping, sounding groups by grouping cable modems mapped to a same RxADC into a respective sounding group, wherein a sounding group is indicative of an upper bound of possible interfering cable modems;

group, based on the sounding groups, the cable modems into transmission groups, wherein the common communication bandwidth is configurable into a plurality of non-overlapping full duplex sub-bands; and control cable modems within a transmission group to perform either only upstream communication or only downstream communication within a respective sub-band during any allocated time-slot, thereby limiting interference.

14. The full duplex node of claim 13, wherein the controller controls (i) a first cable modem within a first transmission group to perform upstream communication and (ii) a different cable modem within a different transmission group performs downstream communication within a respective sub-band during any allocated time-slot.

15. A full duplex node comprising a hardware controller configured to interoperate remotely with a controller comprising:

at least one processor; and at least one memory configured to store information for the at least one processor, wherein the at least one processor is configured to:

discover a mapping between receive analogue to digital converters (RxADCs) of the full duplex node and cable modems connected to the full duplex node, wherein the cable modems share a common communication bandwidth;

determine, based on the mapping, sounding groups by grouping cable modems mapped to a same RxADC into a respective sounding group, wherein a sounding group is indicative of an upper bound of possible interfering cable modems;

group, based on the sounding groups, the cable modems into transmission groups, wherein the common communication bandwidth is configurable into a plurality of non-overlapping full duplex sub-bands; and control cable modems within a transmission group to perform either only upstream communication or only downstream communication within a respective sub-band during any allocated time-slot, thereby limiting interference.

16. The full duplex node of claim 15, wherein the hardware controller controls (i) a first cable modem within a first transmission group to perform upstream communication and (ii) a different cable modem within a different transmission group to perform downstream communication within a respective sub-band during any allocated time-slot.

17. A hardware-implemented method comprising:

the hardware discovering a mapping between receive analogue to digital converters (RxADCs) of a full duplex node and cable modems connected to the full duplex node, wherein the cable modems and full duplex node share a common communication bandwidth; and the hardware determining, based on the mapping, sounding groups by grouping cable modems mapped to a same RxADC into a respective sounding group, wherein a sounding group is indicative of an upper bound of possible interfering cable modems;

the hardware grouping, based on the sounding groups, the cable modems into transmission groups, wherein the common communication bandwidth is configurable into a plurality of non-overlapping full duplex sub-bands; and the hardware controlling cable modems within a transmission group to perform either only upstream communication or only downstream communication within a respective sub-band during any allocated time-slot, thereby limiting interference.

18. The method of claim 17, wherein the hardware controls (i) a first cable modem within a first transmission group to perform upstream communication and (ii) a different cable modem within a different transmission group to perform downstream communication within a respective sub-band during any allocated time-slot.

* * * * *